(12) United States Patent
Griffin et al.

(10) Patent No.: US 9,386,270 B2
(45) Date of Patent: Jul. 5, 2016

(54) DISPLAYING INFORMATION ABOUT AT LEAST ONE PARTICIPANT IN A VIDEO CONFERENCE SESSION (71) Applicant: Cisco Technology, Inc., San Jose, CA (US)

(72) Inventors: Keith Griffin, Oranmore (IE); Ainhoa Ostolaza, Akershus (NO)

(73) Assignee: Cisco Technology, Inc., San Jose, CA (US)

( * ) Notice: Subject to any disclaimer, the term of this patent is extended or adjusted under 35 U.S.C. 154(b) by 82 days.

(21) Appl. No.: 14/155,843

(22) Filed: Jan. 15, 2014

(65) Prior Publication Data

US 2015/0201162 A1    Jul. 16, 2015

(51) Int. Cl.
*H04N 7/15* (2006.01)
*H04N 7/14* (2006.01)
*H04L 12/18* (2006.01)

(52) U.S. Cl.
CPC .............. *H04N 7/15* (2013.01); *H04L 12/1822* (2013.01); *H04N 7/147* (2013.01)

(58) Field of Classification Search
CPC ........... H04N 7/15; H04N 7/152; H04N 7/14; H04N 7/142; H04N 7/146
USPC ............. 348/14.01–14.16; 709/204; 715/753; 370/260–261
See application file for complete search history.

(56) References Cited

U.S. PATENT DOCUMENTS

| | | | |
|---|---|---|---|
| 2008/0088698 A1* | 4/2008 | Patel | H04N 7/15 348/14.09 |
| 2008/0163090 A1* | 7/2008 | Cortright | G06F 3/0481 715/771 |
| 2010/0105437 A1* | 4/2010 | Lee | H04M 1/576 455/566 |
| 2012/0066596 A1* | 3/2012 | Feng et al. | 715/719 |
| 2012/0081506 A1* | 4/2012 | Marvit | 348/14.12 |
| 2012/0176467 A1* | 7/2012 | Kenoyer | H04L 29/06027 348/14.08 |
| 2012/0210247 A1 | 8/2012 | Khouri et al. | |
| 2012/0331399 A1 | 12/2012 | Eidelson et al. | |
| 2013/0120522 A1* | 5/2013 | Lian et al. | 348/14.08 |
| 2013/0135180 A1 | 5/2013 | McCulloch et al. | |
| 2013/0254287 A1 | 9/2013 | Biswas et al. | |
| 2014/0104372 A1* | 4/2014 | Calman et al. | 348/14.08 |
| 2014/0340467 A1* | 11/2014 | Kajarekar et al. | 348/14.08 |

OTHER PUBLICATIONS

Goroshko, et al., "Twitter as a Conversation through e-Learning Context," Journal of Social Informatics / Revista de Informatica Sociala, vol. VIII, 2011, No. 15, Sep. 2011, pp. 7-25.

* cited by examiner

*Primary Examiner* — Melur Ramakrishnaiah
(74) *Attorney, Agent, or Firm* — Edell, Shapiro & Finnan, LLC (57) ABSTRACT

In one embodiment, a method is provided in a video conference session which has a video stream, an audio stream and an information stream between at least one first participant and at least one second participant, comprising: detecting, based on an analysis of at least one of the video stream, the audio stream or the information stream of the video conference session, an indication from a first participant of a wish to obtain additional information about at least one second participant selected by the first participant; and selectively providing additional information relating to the selected second participant to a screen of at least one selected target device viewable by the first participant.

20 Claims, 5 Drawing Sheets

DISPLAYING INFORMATION ABOUT AT LEAST ONE PARTICIPANT IN A VIDEO CONFERENCE SESSION

TECHNICAL FIELD

The present disclosure relates generally to the field of communications and, more particularly, to methods and systems for displaying information about at least one participant in a video conference session.

BACKGROUND

In the field of communications, the role of video conferencing has increased, and more and more companies of various sizes and types use video conference tools. Video conference technology is advantageous, as a video conference enables people at two or more distinct locations to interact with each other via two-way video and audio transmissions, thus simulating lifelike face-to-face interactions between people, using advanced visual, audio, and collaboration technologies. Video conference technology thus reduces costs for the companies.

BRIEF DESCRIPTION OF THE FIGURES

Embodiments of the present disclosure will now be described, by way of example, with reference to the accompanying drawings, wherein similar features or elements bear identical reference signs, and in which.

DESCRIPTION OF EXAMPLE EMBODIMENTS

Overview

An example method is provided and includes detecting, based on an analysis of at least one of a video stream, an audio stream or an information stream of a video conference session between at least one first participant and at least one second participant, an indication from a first participant of a wish to obtain additional information about at least one second participant selected by the first participant. The method also includes selectively providing additional information relating to the selected second participant to a screen of at least one selected target device viewable by the first participant.

Another example method is provided and includes receiving, at a portable personal device of at least one first participant, at least one of a video stream, an audio stream or an information stream of a video conference session between the at least one first participant and at least one second participant. The method also includes providing a signal output from the portable personal device of the at least one first participant designating at least one second participant, the at least one second participant being selected by the at least one first participant using the portable personal device; and triggering an action based on the selected at least one second participant. In particular embodiments, the action may comprise any one of the following: selecting at least one of a viewpoint or focus on the selected at least one second participant; notifying the selected at least one second participant of a request from the at least one first participant to interact with the selected at least one second participant; displaying additional information relating to the selected at least one second participant to a screen of at least one selected target device; and/or initiating an interaction with the selected at least one second participant.

DETAILED DESCRIPTION OF EXAMPLE EMBODIMENTS

Figure 1:
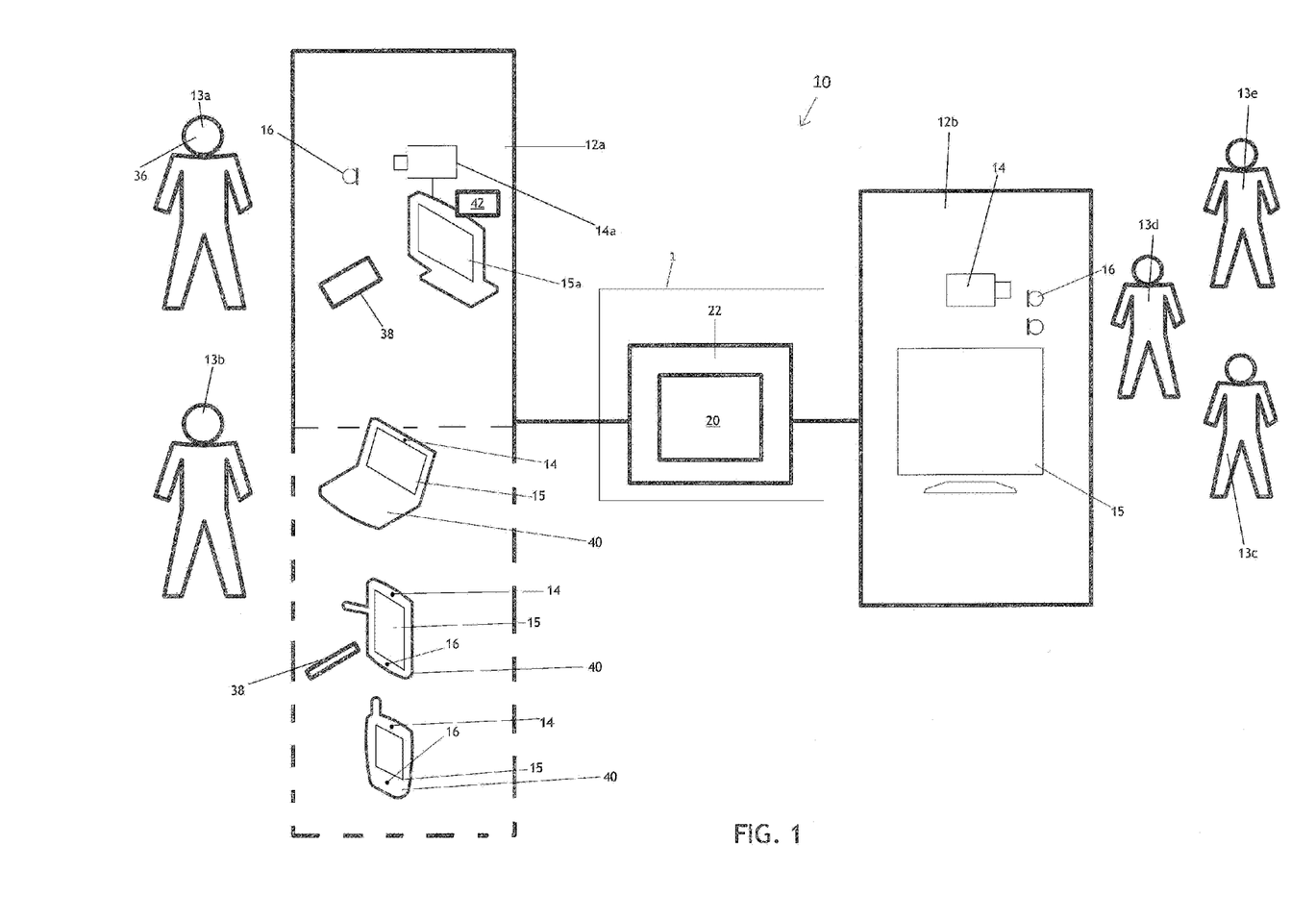
FIG. 1 schematically illustrates an example apparatus for video conferencing in a communication environment according to an example embodiment.

FIG. 1 schematically illustrates an apparatus 10 adapted to implement a video conference session having a video stream, an audio stream and an information stream between at least one first participant 13a and/or 13b and at least one second participant 13c, 13d and/or 13e. For example the video conference session may occur between only two participants, e.g., a first participant 13a and a second participant 13c.

In various embodiments, the apparatus 10 may include multiple endpoints 12a and 12b, which can be associated with various participants 13a-e in the video conference session. In general, endpoints may be geographically separated. Each endpoint 12a or 12b may be associated with at least one participant. In the example of FIG. 1, the endpoint 12a is associated with the first participants 13a and 13b, and the endpoint 12b is associated with the second participants 13c, 13d and 13e. An endpoint 12a or 12b is located, for example, in a meeting room or on a desk of the participant(s) 13a-e. It is however appreciated that such endpoints 12a-b could be provided in any other suitable location, as FIG. 1 only offers one of a multitude of possible implementations according to the disclosure discussed herein. In one example implementation, the endpoints 12a-b are video conference endpoints, which can assist in receiving and communicating video and audio data. It is however appreciated that such endpoints 12a-b could be of a different type, as described in further detail below.

In the example illustrated in FIG. 1, the endpoint 12a comprises at least one camera 14a, at least one microphone 16 and at least one screen 15a, and the endpoint 12b comprises at least one camera 14b, at least one microphone 16 and at least one screen 15b. Each screen 15a-b can display images to be seen by the participants 13a-e. As used herein in this specification, the term 'screen' is meant to designate any element that is capable of displaying an image during a video conference session. This would be inclusive of any panel, display device, telepresence display or wall, computer display, plasma element, television, monitor, at least one window or any other suitable surface or element that is capable of such displaying. Moreover, the screen can encompass each window in a "picture in picture" display on a single display device, where multiple videos or images may be displayed simultaneously, for example, in separate adjacent windows, or in one or more inset windows inside a larger window. In operation, the video conference technology of the apparatus 10 can simulate an in-person lifelike meeting experience for its participants 13a-e. An endpoint 12a-b may also comprise a keyboard or other terminal equipment such as a touch pad and/or a mouse.

In various embodiments, the apparatus 10 may comprise a system 1 adapted to be used in the video conference session. In embodiments, the system 1 may be configured to detect, based on an analysis of at least one of the video stream, the audio stream or the information stream of the video conference session, an indication from a first participant, e.g., 13a, of a wish (desire, request, command, etc.) to obtain additional information about at least one second participant selected by the first participant, e.g., the second participant 13d. In embodiments, the system may be configured to selectively provide additional information relating to the selected second participant 13d to a screen of at least one selected target device, such as the screen 15a of the endpoint 12a, and viewable by the first participant 13a.

In embodiments, the system 1 may comprise a multipoint control unit (MCU) 22 which can be coupled to endpoint 12a and 12b and which may comprise, in embodiments, a multipoint manager element 20. The multipoint manager element 20 may help to coordinate and to process information being transmitted by the participants 13a-e. The MCU 22 can be configured to establish, or to foster, the video conference session between the participants 13a-e.

The MCU 22 and the multipoint manager element 20 can coordinate and process various policies involving the endpoints 12a and 12b. In general, the MCU 22 and the multipoint manager element 20 may communicate with the endpoints 12a and 12b through any standard or proprietary conference control protocol. The multipoint manager element 20 may include a switching component that determines which signals are to be routed to the individual endpoints 12a or 12b for displaying on the screens 15a-b. The multipoint manager element 20 can also determine how individual participants 13a-e are seen by other participants in the video conference session. The multipoint manager element 20 can add visual information to video signals sent to endpoints. For example, the multipoint manager element 20 can generate notifications and send the notifications to participants (e.g., after mixing and overlaying text messages, audio cues, graphics, etc. on outgoing video signals to the endpoints). Furthermore, the multipoint manager element 20 can control the timing and coordination of these activities. The multipoint manager element 20 can also include a media layer that can copy information or data, which can be subsequently retransmitted or simply forwarded along to one or more of the endpoints 12a or 12b. In the example illustrated in FIG. 2, the multipoint manager element 20 may include a processor 24 and a memory 26. There is also a network interface unit, e.g., a network interface card (NIC) 27, in the MCU 22 to enable communications over a network on behalf of the MCU 22.

The apparatus 10 is capable of providing on-screen graphics and text overlay to provide visual status updates and to improve the effectiveness and security of the video session. For example, graphics or text overlay may inform a conference moderator at an endpoint that the meeting is locked or is being encrypted. Graphics and text overlay may have various other uses also, such as menu generation, special effects, assistance for hearing impaired, etc.

In embodiments, the apparatus 10 may comprise at least one portable personal device 40, a portable personal device 40 being associated with, or allocated to, a particular participant, e.g., participant 13a. A portable personal device 40 may belong to a participant, such as the participant 13a; in operation the video conference session may be in a "bring your own device" (BYOD) scenario.

In examples, the portable personal device 40 may comprise at least one of a telephone, such as a cell phone, a computer, a personal digital assistant (PDA), a laptop or electronic notebook, a smart phone, a tablet, any other type of smart device, component, element, or object capable of initiating at least one of video, voice, audio, or data exchanges within the apparatus 10. The portable personal device 40 may include a suitable interface to the participant, e.g., 13a, such any one of the following as appropriate for the video conference session, such as a microphone 16, a camera 14, a screen 15 such as a display device and/or a touch screen, and/or a keyboard, or any other terminal equipment, such as a mouse or a touch pad.

In embodiments, the personal device 40 may be configured to receive at least one of the video stream, the audio stream or the information stream of the video conference session. In examples, the personal device 40 may be configured to provide a signal output designating at least one second, target, participant, e.g., 13d. For example the at least one second participant may be selected by the first participant 13a using the portable personal device 40. In example embodiments, the personal device 40 may be configured to trigger an action based on the selected at least one second participant.

In example embodiments, the endpoint or portable device may enable the first or requesting participant to select the second or target participant. In example embodiments the requesting participant may obtain additional information relating to a target participant, even if he or she joined the video conference session after the beginning of the video conference session, i.e. usually when the participants introduce themselves to the other participants. In example embodiments, the requesting participant may designate a target screen for the selective display of the additional information relating to the target participant. In example embodiments, the target screen may include a screen of a portable personal device of the requesting participant, which may prevent the other participants from noticing that the requesting participant has asked for additional information and/or which may prevent the display of the additional information from impairing the video conference experience of the other participants and/or the requesting participant.

In example embodiments the requesting participant may have a plurality of convenient possibilities for indicating that he or she requests additional information about a participant. In example embodiments the requesting participant may use his or her device in a "bring your own device" scenario.

In example embodiments the requesting participant may obtain additional information relating to the target participant.

In example embodiments the requesting participant may trigger an action, such as selecting at least one of a viewpoint or focus on the selected at least one second participant; notifying the selected second or target participant of a request from the first participant to interact with the selected second participant; displaying additional information relating to the selected second participant to a screen of at least one selected target device; and/or initiating an interaction with the selected second participant, such as an instant message; an email; and/or an invitation to join a social network community and/or a meeting, etc. Real-time or near-real time contextual information may be selectively provided to the target device, with opportunities for initiating interaction with the target participant. In example embodiments the selection and/or the action may be performed on the portable personal device, and may be unnoticed by the other participants. The selection and/or the action may be confidential or related to exchange of confidential information. The selection and/or the action may not impair the video conferencing experience of the requesting participant and/or other participants. Participants may be more informed about each other, which may promote a more informed and personal collaboration experience during the video conference session.

System

Figure 2:
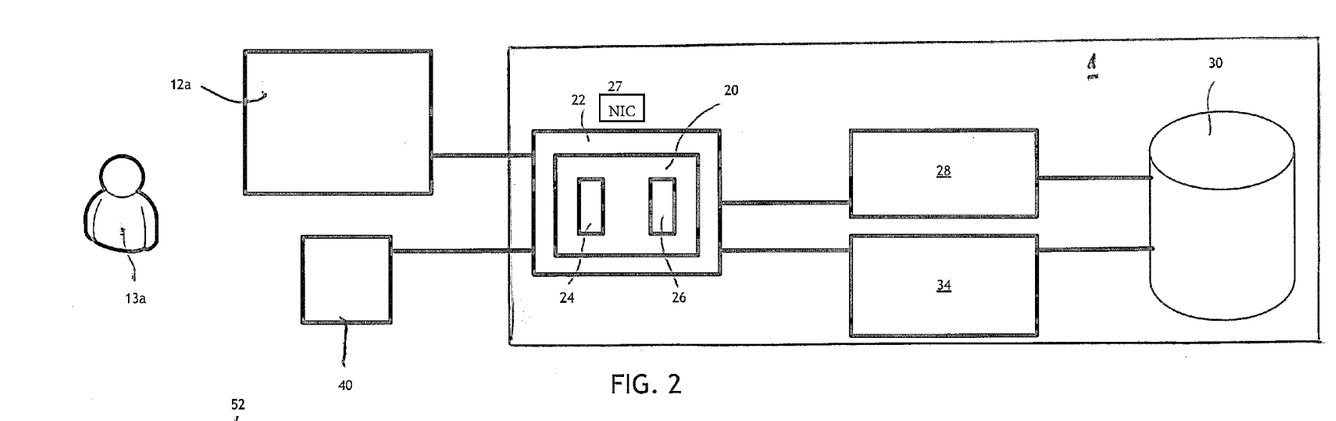
FIG. 2 schematically illustrates a block diagram of example details of the apparatus according to an example embodiment.
Figure 3A:
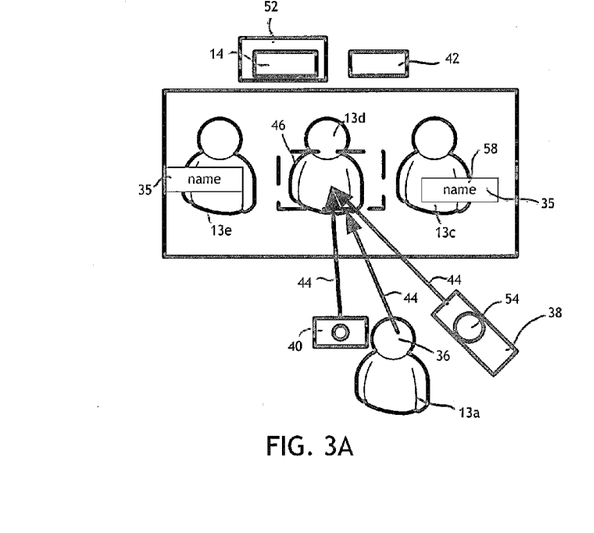
FIG. 3A schematically illustrates a block diagram of example details of the apparatus according to an example embodiment.
Figure 3B:
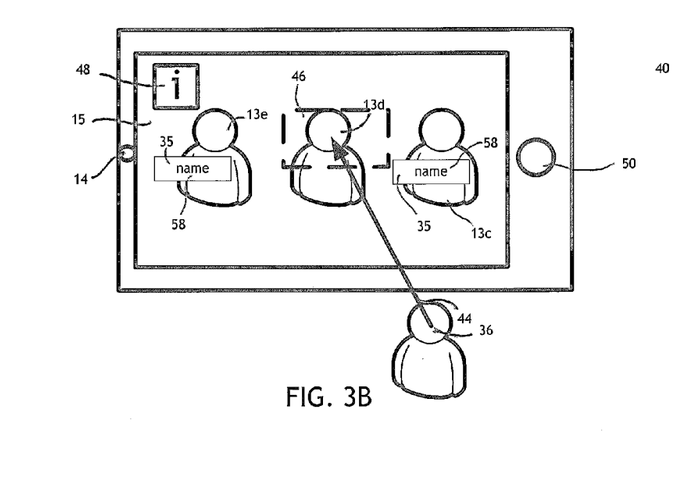
FIG. 3B schematically illustrates a block diagram of example details of the apparatus according to an example embodiment.

Reference is now made to FIGS. 2, 3A and 3B. In the example illustrated in FIG. 2, the system 1 comprises an analysis module 28, a database 30, a target participant recognition module 34 and the MCU 22.

The analysis module 28 may access the database 30, and the target participant recognition module 34 may access the database 30.

In embodiments, the analysis module 28 may receive signals (such as information and/or audio and/or video streams) from the multipoint manager element 20.

The analysis module 28 may analyze at least one of the video stream, the audio stream or the information stream of the video conference session, such as a signal from an originating device, which may be an endpoint or a portable personal device. In one example embodiment, the signal may be provided to the analysis module 28 indirectly from the originating device via the multipoint manager element 20.

In an example embodiment, a requesting participant 13a among the first participants of the video conference session may indicate a wish to obtain additional information about at least one target participant 13d among the second participants, by selecting the at least one target participant, e.g. by pointing to the selected at least one second participant using at least one of an object or at least one body part of the first participant. For example, and as explained in greater detail below, the pointing may include gesture-based control, such as physically pointing, blinking or staring. In an example embodiment, the analysis module 28 may be configured to detect the indication by the requesting participant 13a. To that end, the analysis module 28 may include any appropriate combination of hardware and/or software modules for providing any of the features discussed herein. The analysis module 28 may use the result of the analysis as a basis for sending information through the apparatus 10.

In an example, the analysis module 28 may be configured to perform at least one of detecting a direction 44 (see FIGS. 3A and 3B) indicated or designated by the requesting participant with respect to the originating device; or identifying a zone 46 indicated or designated by the requesting participant on the originating device.

In an example embodiment, the analysis module 28 may detect the direction 44 indicated or designated by the requesting participant 13a with respect to the video conference endpoint 12a by performing at least one of: detecting a direction of at least one body part 36 of the requesting participant 13a; or detecting a direction of at least one identifiable object used by the requesting participant 13a.

In an example the body part 36 of the requesting participant 13a may comprise at least one of: a head; an eye; an arm; a hand; or a finger. The endpoint 12a associated with the requesting participant 13a may then be used to determine the direction of, for example, at least one of a gaze or a look or a stare and/or a head nod or a blink or another facial or hand gesture by the requesting participant 13a.

In an example the at least one identifiable object may comprise at least one of: a remote control 38; or a physical pointer, such as a pen, a stylus or a stick, or even a portable personal device 40. The endpoint 12a associated with the requesting participant 13a may be used to determine the direction of pointing of the identifiable object by the requesting participant 13a. In an example embodiment, the endpoint 12a associated with the requesting participant may be used to detect the zone 46 which at least the one body part 36 of the requesting participant 13a or the identifiable object is directed to. In an example, the zone 46 may be indicated by a pointing device such as a mouse and/or a touch screen.

The analysis module 28 may analyze at least one of the video stream, the audio stream or the information stream of the video conference session during the video conference session. The analysis module 28 may be configured to determine the originating device, such as the endpoint 12a in the example illustrated in FIG. 3A, and inform the multipoint manager element 20 that the indication by the requesting participant 13a has been detected at the determined originating device. In an example, the analysis module 28 may determine coordinates of a target location on the screen 15 related to the indication. The analysis module 28 may then return the coordinates to the multipoint manager element 20. In an example embodiment, the analysis module 28 may be part of at least one of any of the following: an ocular tracking system that measures the target location of a gaze of the requesting participant; an IR tracking system 42 (especially e.g. when the identifiable object is the remote control 38 using an IR signal for target indication); and/or a video tracking system comprising the camera 14a that measures the indication by the identifiable object. As another possibility or additionally, the analysis module 28 may use an output of a pointing device and/or a touch screen input to determine the coordinates of the indication of the target location.

In an example embodiment, the participant may participate in the video conference session using their portable personal device 40. In an example, the participant may provide the indication using their portable device 40. The indication may be any of the indications already described depending on the functionality of the portable device 40. For example, the indication by the requesting participant may be performed using a gaze of the requesting participant if the portable device 40 comprises a camera or a selection by a finger (such as performing a tap or a double tap) or by a mouse pointer (such as a hover or a click), in the case where the device 40 has a touch screen or a mouse.

In an example, the selection by the first participant 13a is performed in an explorative mode on the originating device. For example the switching on of the explorative mode may be performed on the endpoint 12a as illustrated in FIG. 3A and/or on a portable personal device 40 as illustrated in FIG. 3B.

In the example illustrated in FIG. 3A, the analysis module 28 may be configured to detect when the requesting participant 13a picks up a remote controller 38 associated with the endpoint 12a; and/or when the requesting participant 13a depresses a button and/or switch on the remote controller 38.

In an example embodiment, the portable personal device 40 may be configured to initiate the explorative mode in response to a selection of a trigger interface 48 in a user interface of the screen 15 of the portable personal device 40. In an example, the requesting participant may select the trigger interface 48 for entering the explorative mode. In an example, the portable personal device 40 may have a switch or button 50 dedicated, at least temporarily, to entry in the explorative mode. In the example illustrated in FIG. 3B, the analysis module 28 may be configured to detect when the requesting participant 13a selects the trigger interface 48 on a screen 15 of the portable personal device 40; and/or when the requesting participant 13a depresses the button and/or the switch 50 on the portable personal device 40. For example the switch 48 and/or 50 may be a software switch.

In the examples illustrated in FIGS. 3A and 3B, once the explorative mode is activated, an interface 35 indicating identification 58 of the second participants 13c, 13d and/or 13e may be displayed on the screen 15a of the endpoint 12a (FIG. 3A) and/or 15 of the portable personal device 40. In an example (not represented on the figures), no information interface is displayed once the explorative mode is activated.

In an example, the analysis module 28 may be configured to detect the indication of the requesting participant 13a to obtain the additional information by detecting navigation through the second participants 13c-e displayed on a screen 15a using a remote controller 38 associated with an endpoint 12a associated with the first participant 13a. For example, the requesting participant 13a may navigate using a navigation wheel 54 of the remote 38 to select the participant 13d as shown in FIG. 3B.

As another possibility or additionally, in the explorative mode the participant may use any of the indication techniques described above.

In an example embodiment, the multipoint manager element 20 may access information from database 30 based on the determined coordinates, corresponding to the location of the image of the target participant 13d displayed on the screen 15a of the endpoint 12a or the screen 15 of the device 40.

The multipoint manager element 20 may also identify the target participant 13d using a target participant recognition module 34 shown in FIG. 2.

The target participant recognition module 34 may receive video signals from the multipoint manager element 20. In an example embodiment, the target participant recognition module 34 may determine an identity of the target participant 13e using at least one of the following: face recognition; voice recognition; determination of an endpoint 12b associated with the target participant 13d (for example when a single participant is associated with an endpoint); and/or determination of a location associated with the target participant (for example when the participants are assigned a specific location which can be determined by the module 34). For example the module 34 may implement a directory function required to resolve a participant's ID to name. Additionally or alternatively, the module 34 may store images and/or audio files and/or participants' coordinates as a source for face and/or voice and/or location recognition. The module 34 may be configured to use the identity of the target participant 13d as a basis for sending information through the apparatus 10.

In an example, the identifying of at least one participant 13d may be performed at a startup of the video conference session. In an example where the identifying of at least one participant is performed at the startup of the video conference session, the results may be cached locally in the memory 26 of the multipoint manager element 20 in order to reduce the time for providing the identification and/or the additional information to the endpoint 12a and/or the device 40. In an example the identifying of at least one participant may be performed during the video conference session, for example when ad-hoc participants join an in-progress video conference session. In an example, the identifying may be performed on a request by a participant 13a during the video conference session.

In an example, the database 30 may include additional information about the participants 13a-e as described in greater detail below; locations of corresponding endpoints 12a-b; profiles of the participants 13a-e, policies to be applied for particular video conferencing arrangements, user preferences; references associated with a particular host, administrator, or of the participants 13a-e, and any other information that may be used by the designation recognition module 32, an administrator, and/or the multipoint manager element 20 to perform the intended functionality of the apparatus 10, as described herein.

In an example, the module 34 may be further configured to retrieve additional information once the target participant 13d is identified. In an example, the module 34 may be configured to retrieve the additional information from the database 30.

In an example, the additional information may comprise at least any one of the following: a forename; a family name; a company name; a department name; a job title; an organizational role; a skill; an expertise; a location; a contact detail; a telephone number; a mail address; an email address; a calendar availability status; an instant messaging availability status; a community membership; a social network membership; an identification of a social network connection; an interest; a recent work; and/or a recent publication, etc.

The database 30 may be comprised at least partly in a collaboration system; an identity platform; and/or a corporate directory. The database 30 may be provisioned internally within the multipoint manager element 20, outside the multipoint manager element 20 (e.g., in a network device coupled to the multipoint manager element 20), or locally at a particular network location which could foster communications with the multipoint manager element 20 and/or the designation recognition module 32, and/or the module 34 or any combination thereof. Certain user information may be populated in the recognition module 34, the analysis module 28 and/or the database 30.

In an example, the module 34 may be further configured to provide the additional information, after any appropriate formatting, relating to the target participant to the screen of at least one selected target device once the additional information data is retrieved form the database 30, e.g. via the multipoint manager element 20.

In an example, the multipoint manager element 20 may be configured to generate a user interface 35 provided to the selected target device and comprising the additional information.

For example the user interface 35 may comprise an element such as identification relating to the target participant and/or a unified communication (UC) icon as described in further detail below.

In an example, the user interface 35 may comprise an interface displayed, in response to the detecting of the indication of the wish of the participant 13a, over a zone associated with the target participant 13d on the screen of the at least one selected target device such as the screen 15a of the endpoint 12a and/or on the screen 15 of the portable personal device 40. In an example, the user interface 35 may comprise tools to collaborate and interact with other participants and communities within a participant's social network. The interface 35 may include various links to other participants and communities. For example, the interface 35 may include numerous instances of links to other participants.

For example the user interface 35 may comprise a hover card to provide a convenient way to further interact with another participant or community that is represented by one of these links. The hover card that may appear on the screen 15a and/or 15 when the requesting participant hovers over a zone corresponding to another participant.

Figure 4A:
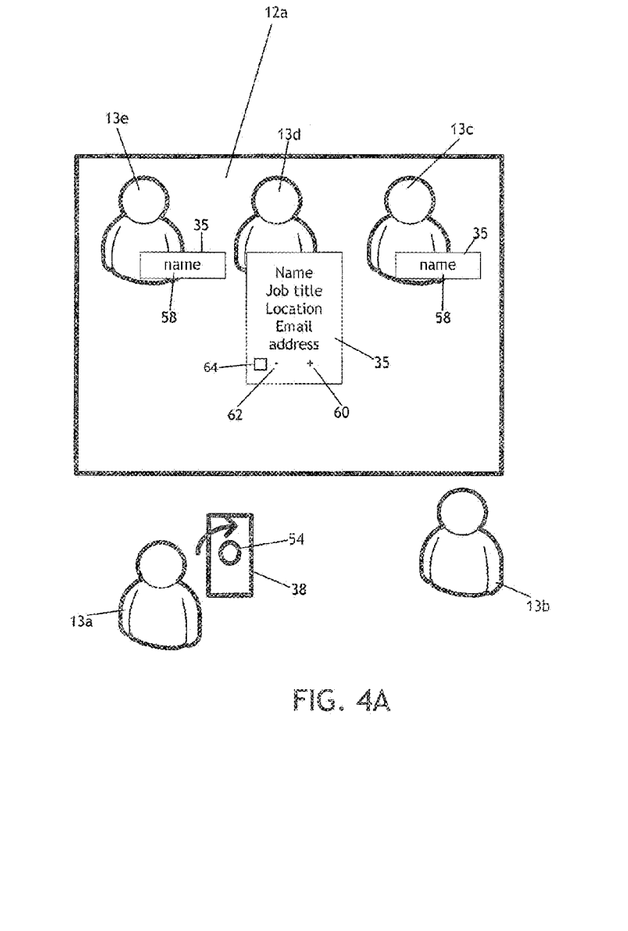
FIG. 4A schematically illustrates a block diagram of example details of the apparatus according to an example embodiment.
Figure 4B:
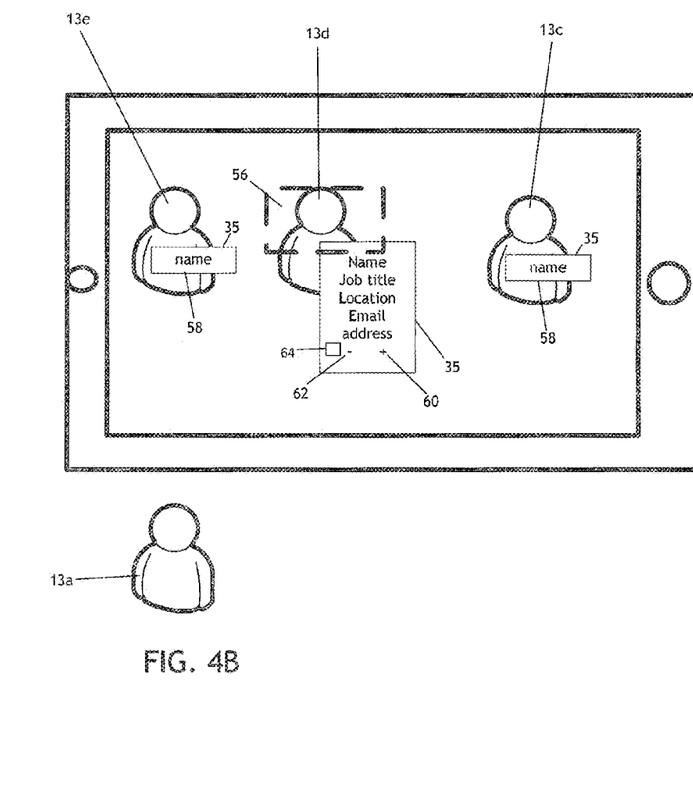
FIG. 4B schematically illustrates a block diagram of example details of the apparatus according to an example embodiment.

FIGS. 4A and 4B illustrate an example of an interface 35 that may include a hover card. In certain embodiments, hover card may appear on the screen 15a and/or 15 proximate to a pointer when the participant 13a hovers the pointer over a zone corresponding to the target participant 13b. The hover card may comprise for example an element such as identification 58 relating to the target participant and/or a unified communication (UC) icon 64 which may be used by the requesting participant in order to initiate interaction by selecting the UC icon 64 by a click-to-call and/or tap-to-call, click-to-call and/or tap-to-call, click-to-instant message (IM) and/or tap-to-IM, click-to-meeting and/or tap-to-meeting, or the like.

The multipoint manager element 20 may be configured to mix and overlay the user interface 35 on an outgoing video signal, and subsequently send the outgoing video signal to the target endpoint and/or the selected target device (such as the endpoint 12*a* and/or the device 40). The user interface 35 may be displayed selectively on one or more screens, which may be viewable by the requesting participant 13*a*.

In an example, the additional information may be selectively provided by default to the screen associated with the originating device where the second, or target, participant 13*d* was selected. In an example, the originating device may enable the participant 13*a* to select, using an interface, the screen to which the information may be selectively provided, for example the screen of another participant or their portable personal device.

In examples, the user interface 35 may be user or administrator configurable, in order to avoid repeated displays of the user interface 35. In an example, the user interface 35 could be shown a predetermined number of times (such as one time) and/or on demand by the requesting participant 13*a*.

In an example, the multipoint manager element 20 may be configured to adapt a size of the user interface to take into account an increment or a decrement of the additional information requested by the first participant, in order e.g., to preserve a natural video conference experience while providing as much information to the user as desired. This may avoid impairing the viewing experience of the video conference by the requesting participant 13*a* or the other participants such as the participant 13*b*. In an example, the participant 13*a* may indicate an increment in the additional information by selecting a dedicated zone 60 in the user interface 35, such as indicating a "+". For example the user interface 35 may, when the participant 13*a* indicates a first increment by selecting the "+" zone 60, display, e.g., the job title and/or the location of the participant 13*d* further to the identification 58 already displayed, and, when the participant 13*a* indicates a second increment by further selecting the "+" zone 60, display e.g. the email address of the participant 13*d* further to the identification 58, the job title and/or the location. In an example, the participant 13*a* may indicate a decrement in the additional information by selecting a dedicated zone 62 in the user interface 35, such as indicating a "−". For example the user interface 35 may, when the participant 13*a* indicates a decrement by selecting the "−" zone 62, make e.g. the identification 58, the job title, the location, and/or the identification 58 of the participant 13*d* disappear from the interface 35 or make the user interface 35 disappear from the screen 15 and/or 15*a*.

Originating Device and Target Device

The originating device and the target device have been described above. As described above a camera 14*a* provides an image of the participants. As another possibility or additionally, at least one participant may be represented on a screen by a schematic representation and/or an avatar.

Various ways of selecting a target participant and triggering an action are described above. As another possibility or additionally, the action may be selecting at least one of a viewpoint or focus on the selected at least one second participant 13*d*. For example the displayed image may be zoomed and/or otherwise modified to show only the target participant 13*d* on the screen 15 of the device 40 and/or on the screen 15*a* of the endpoint 12*a*.

In an example, the action may be notifying the selected at least one second participant of a request from the at least one first participant 13*a* to interact with the selected at least one second participant 13*d*. For example, a message provided in an interface may be displayed on a screen viewable by the participant 13*d*.

In an example, the action may be initiating an interaction with the selected at least one second participant, such as an instant message; an email; and/or an invitation to join a social network community and/or a meeting, etc. In an example, the initiation may be triggered by a selection of a UC icon in the interface 35, such as a tap and/or a click on the icon 64 as shown on the screen 15 of the device 40.

In a particular implementation, the user interface may be displayed on the screen 15 of the personal device 40 but not on the screen of another device such as the endpoint 12*a*. For example, where the video conference session occurs between the at least one first participant, the at least one second participant and at least one third participant, the additional information may not be provided to a screen viewable by the at least one third participant. In another example embodiment, the user interface 35 may be displayed on a plurality of screens 15 associated with one participant simultaneously. In an example, the user interface 35 may be shown both on the screen 15*a* of the endpoint 12*a* and on the screen 15 of the device 40, for example in a mixed mode where both shared screen 15*a* and private screen 15 overlay.

Methods

Figure 5:
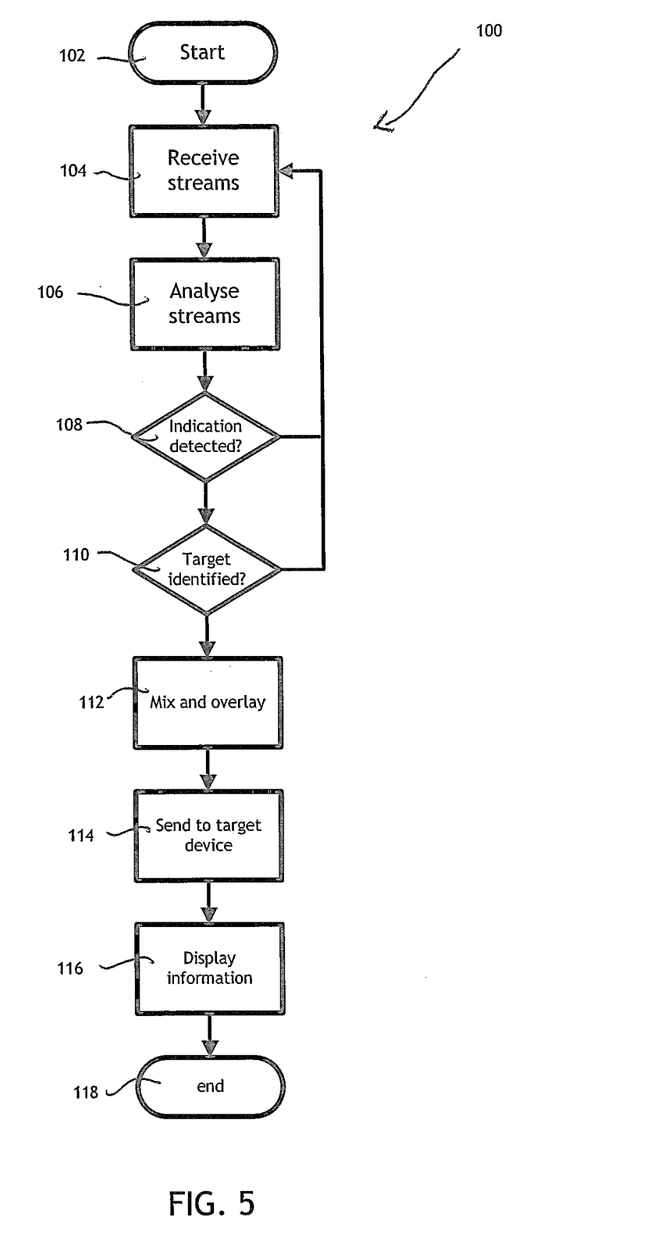
FIG. 5 schematically illustrates an example flowchart showing example operations associated with an example embodiment of the apparatus.

FIG. 5 is a simplified flowchart illustrating example operational activities 100 associated with embodiments of the present disclosure.

The particular flow of FIG. 5 may begin at 102, when the multipoint manager element 20 is activated.

In 104, the multipoint manager element 20 may receive a video stream, an audio stream and an information stream from an originating endpoint corresponding to the video conference.

In 106, the multipoint manager element 20 may analyze at least one of the video stream, the audio stream or the information stream of the video conference session.

In 108, a determination can be made whether an indication of a wish for additional information is detected. For example, if nobody stares or blinks in a particular way at any particular participant or if nobody selects a target participant in any of the ways described above, for example, by navigating using a remote controller 38; pointing to a selected second participant 13*d* using at least one of an object or at least one body part of a first participant; and/or selecting a selected second participant using a portable personal device of a first participant, a wish/desire/command/request to obtain information about a target participant 13*d* may not be detected. In this case, the process may revert to 104. However, if a signal indicates that a requesting participant e.g., participant 13*a*, is indicating a wish/desire/command/request for information, then a wish/desire/command/request may be detected.

If an indication of a wish/desire/command/request for additional information is detected, in 110 an identification of the target participant 13*d* may be determined. In an example, the identification may be performed by the module 34. In an example embodiment, the identification may be performed by the multipoint manager element 20. If the target participant is not registered in the database 30, identification may not be detected, in which case, the process may revert to 104. However, if the target participant is registered in the database 30, then the target participant may be identified.

If the target participant 13*d* is identified, in 112 the multipoint manager element 20 may mix and overlay the information on an outgoing signal to a selected target device. In 114, the outgoing signal may be sent to the selected target device.

The additional information relating to the target participant may be selected displayed on one or more screens viewable by the requesting participant in 116.

The process may end in 118, where similar operations can be repeated for subsequent flows (e.g., when the requesting participant and/or the target participant change).

Figure 6:
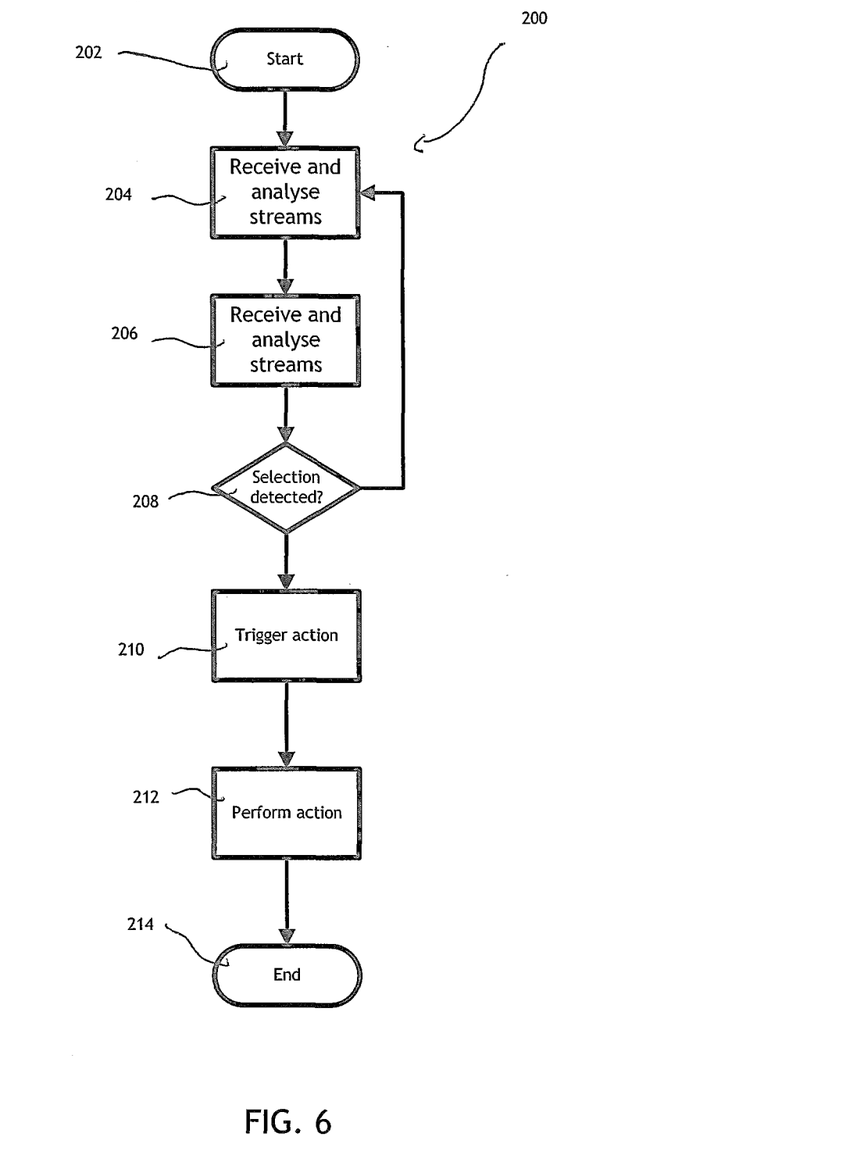
FIG. 6 schematically illustrates an example flowchart showing example operations associated with an example embodiment of the apparatus.

FIG. 6 is a simplified flowchart illustrating example operational activities 200 associated with embodiments of the present disclosure.

The particular flow of FIG. 6 may begin at 202, when a video conference session between at least one of the participants 13*a-b* and at least one of the 13*c-e* is started. During the video conference at least one or more participants, e.g., 13*a*, may have a portable personal device 40. At 204, the multipoint manager element 20 may be activated. In 206, the portable personal device 40 of the at least one participant 13*a* may receive and analyze at least at least one of a video stream, an audio stream or an information stream of the video conference session. In 208, a determination can be made whether a selection of a target participant 13*d* is detected. For example, if nobody uses their portable personal device, a selection of a target participant 13*d* may not be detected, in which case, the process may revert to 204. However, in an example the portable personal device associated with the least one participant 13*a* may enable the requesting participant to select a target participant 13*d*. If a selection is detected, in 210 an action based on the selected at least one second participant 13*b* may be triggered. In 212, the action may be performed, e.g. by a target device. In examples, the action may comprises at least one of the following: selecting at least one of a viewpoint or focus on the selected at least one second participant; notifying the selected at least one second participant of a request from the at least one first participant to interact with the selected at least one second participant; displaying additional information relating to the selected at least one second participant to a screen of at least one selected target device; and/or initiating an interaction with the selected at least one second participant.

The process may end in 214, where similar operations can be repeated for subsequent flows (e.g., when the requesting participant and/or the target participant change).

In example embodiments, the apparatus 10 may be configured as one or more networks. Additionally, networks may be provisioned in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In example embodiments, elements of the apparatus 10 may be coupled to one another through one or more interfaces employing any suitable connection (wired or wireless), which provides a viable pathway for electronic communications. Additionally, any one or more of these elements may be combined or removed from the architecture based on particular configuration needs. The apparatus 10 may include a configuration capable of transmission control protocol/Internet protocol (TCP/IP) communications for the electronic transmission or reception of packets in a network. The apparatus 10 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various elements.

In example embodiments, components of the apparatus 10 may use specialized applications and hardware. The apparatus 10 can use Internet protocol (IP) technology and run on an integrated voice, video, and data network. The apparatus 10 can also support high quality, real-time voice, and video communications using broadband connections. In example embodiments, the apparatus 10 can further offer capabilities for ensuring quality of service (QoS), security, reliability, and high availability for high-bandwidth applications such as video. Power and Ethernet connections for participants can also be provided. For example a participant can use their laptops to access data for the meeting, join a meeting place protocol or a Web session, or stay connected to other applications throughout the meeting.

The term 'endpoint' may be inclusive of devices used to initiate a communication, such as a switch, a console, a proprietary endpoint, a telephone, a bridge, a computer, a personal digital assistant (PDA), a laptop or electronic notebook, a smart phone, tablet, any other type of smart device, component, element, or object capable of initiating voice, audio, or data exchanges within the apparatus 10. The endpoints 12*a* and 12*b* may also include any device that seeks to initiate a communication on behalf of another entity or element, such as a program, a database, or any other component, device, element, or object capable of initiating a voice or a data exchange within the apparatus 10. Data, as used herein, refers to any type of video, numeric, voice, or script data, or any type of source or object code, or any other suitable information in any appropriate format that may be communicated from one point to another.

In example implementations, at least some portions of the activities related to displaying information about a participant in a video conference outlined herein may be implemented in software in, for example, the analysis module and/or the multipoint manager element. In some embodiments, one or more of these features may be implemented in hardware, provided external to these elements, or consolidated in any appropriate manner to achieve the intended functionality. The MCU 22, the analysis module 28, and/or the multipoint manager element 20 may include software (or reciprocating software) that can coordinate in order to achieve the operations, as discussed herein. In still other embodiments, these elements may include any suitable algorithms, hardware, software, components, modules, interfaces, or objects that facilitate the operations thereof. In addition, the MCU 22 and/or multipoint manager element 20 described and shown herein (and/or their associated structures) may also include suitable interfaces for receiving, transmitting, and/or otherwise communicating data or information in a network environment. Logistically, the MCU 22, the analysis module 28, and/or the multipoint manager element 20 may be implemented as a computer application on a non-transitory computer readable medium. In certain example implementations, the analysis module 28 may be implemented in the MCU 22. In yet another example embodiment, the analysis module 28 may be part of multipoint manager element 20. In yet another example embodiments, the analysis module 28 may be located on one or more of the endpoints 12a or 12b, or on a device, such as a device 40, that is accessible by the multipoint manager element 20 (e.g., over a network connection). Various other potential implementations of the analysis module 28 may be employed without departing from the broad scope of the present disclosure.

In a particular implementation, the multipoint manager element 20 is a server provisioned to perform the activities discussed herein. More generally, the multipoint manager element 20, the MCU 22, and/or the analysis module 28 are network elements, where the term "network element" is meant to encompass computers, network appliances, servers, routers, switches, gateways, bridges, load balancers, firewalls, processors, modules, software applications, or any other suitable device, component, element, or object operable to exchange information in a network environment. Moreover, the network elements may include any suitable hardware, software, components, modules, interfaces, or objects that facilitate the operations thereof. Multipoint manager element 20, MCU 22, and/or the analysis module 28 can be consolidated, rearranged, and/or provisioned within each other in any suitable arrangement without departing from the scope of the present disclosure.

In some of example embodiments, one or more memory elements (e.g., the memory element 34) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor 24 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in the apparatus 10 can include one or more memory elements (e.g., the memory element 34) for storing information to be used in achieving the operations as outlined herein. These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in the apparatus 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

Additionally, some of the processors and memory elements associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. Countless possible design configurations can be used to achieve the operational objectives outlined here. Accordingly, the associated infrastructure has a myriad of substitute arrangements, design choices, device possibilities, hardware configurations, software implementations, equipment options, etc.

With the numerous examples provided herein, interaction may be described in terms of two, three, four, or more network elements. However, this has been done for purposes of clarity and example only. It should be appreciated that the apparatus can be consolidated in any suitable manner. Along similar design alternatives, any of the illustrated computers, modules, components, and elements of the figures may be combined in various possible configurations, all of which are clearly within the broad scope of this Specification. In certain cases, it may be easier to describe one or more of the functionalities of a given set of flows by only referencing a limited number of network elements. It should be appreciated that the apparatus 10 of the figures and its teachings are readily scalable and can accommodate a large number of components, as well as more complicated/sophisticated arrangements and configurations. Accordingly, the examples provided should not limit the scope or inhibit the broad teachings of the apparatus 10 as potentially applied to a myriad of other architectures.

In this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

The operations and steps described with reference to the preceding figures illustrate only some of the possible scenarios that may be executed by, or within, the apparatus. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the apparatus in that any suitable arrangements, chronologies, configurations, and timing mechanisms may be provided without departing from the teachings of the discussed concepts. Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, the apparatus 10 may be applicable to other exchanges or routing protocols. Moreover, although the apparatus 10 has been illustrated with reference to particular elements and operations that facilitate the communication process, these elements and operations may be replaced by any suitable architecture or process that achieves the intended functionality of the apparatus 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method in a video conference session having a video stream, an audio stream and an information stream between at least one first participant and at least one second participant, comprising:
   detecting, based on an analysis of at least one of the video stream, the audio stream or the information stream of the video conference session, an indication from a first participant of a wish to obtain additional information about at least one second participant;
   selecting the at least one second participant according to a direction indicated by the first participant; and
   selectively providing additional information relating to the selected at least one second participant to a screen of at least one selected target device viewable by the first participant.

2. The method of claim 1, wherein the direction is indicated by the first participant via at least one of:
   navigating a remote controller associated with the first participant;
   pointing to the selected at least one second participant with at least one of an object or at least one body part of the first participant; and
   selecting the selected at least one second participant at a portable personal device of the first participant.

3. The method of claim 2, wherein the portable personal device comprises at least one of: a telephone; a computer; a personal digital assistant (PDA); a laptop; an electronic notebook; a smart phone; and a tablet.

4. The method of claim 1, wherein the at least one selected target device comprises at least one of:
   an endpoint associated with the first participant in the video conference session; and
   a portable personal device of the first participant.

5. The method of claim 4, wherein the portable personal device comprises at least one of: a telephone; a computer; a personal digital assistant (PDA); a laptop; an electronic notebook; a smart phone; and a tablet.

6. The method of claim 1, wherein the selectively providing of the additional information to the screen of the at least one selected target device further comprises:
   displaying at least one unified communication (UC) icon.

7. The method of claim 1, wherein the additional information comprises at least one of: a forename; a family name; a company name; a department name; a job title; an organizational role; a skill; an expertise; a location; a contact detail; a telephone number; a mail address; an email address; a calendar availability status; an instant messaging availability status; a community membership; a social network membership; an identification of a social network connection; an interest; a recent work; and a recent publication.

8. The method of claim 7, further comprising:
   retrieving the additional information from a database of at least one of: a collaboration system; an identity platform; and a corporate directory.

9. The method of claim 1, further comprising:
   displaying a user interface in response to the detecting of the indication from the first participant, wherein the user interface is displayed over a zone associated with the selected at least one second participant on the screen of the at least one selected target device subsequent to the direction being indicated by the first participant.

10. The method of claim 9, wherein the selectively providing of the additional information comprises adapting a size of the user interface to take into account an increment or a decrement of the additional information requested by the first participant.

11. The method of claim 1, wherein the video conference session occurs between the at least one first participant, the at least one second participant and at least one third participant, and the method further comprises:
    withholding the additional information from a screen viewable by the at least one third participant.

12. The method of claim 1, wherein the at least one second participant is one of a plurality of second participants displayed on a screen viewable by the first participant, and selecting the at least one second participant further comprises:
    identifying the selected at least one second participant among the plurality of second participants via at least one of: face recognition; voice recognition; a determination of an endpoint associated with the selected at least one second participant; and a determination of a location associated with the selected at least one second participant.

13. The method of claim 12, wherein the identifying of the selected at least one second participant further comprises:
    searching a database comprising at least one of: a collaboration system; an identity platform; and a corporate directory.

14. The method of claim 12, wherein the identifying of the selected at least one second participant occurs upon at least one of: a startup of the video conference session; the indication from the first participant during the video conference session; and the selected second participant joining the video conference session.

15. The method of claim 1, further comprising:
    performing an action based on the selecting of the at least one second participant, wherein the action comprises at least one of:

selecting at least one of a viewpoint or a focus on the selected at least one second participant;

notifying the selected second participant of a request from the first participant to interact with the selected at least one second participant in an interaction; and initiating an interaction with the selected at least one second participant.

16. The method of claim 15, wherein the interaction with the selected at least one second participant comprises at least one of: an instant message; an email; an invitation to join a social network community; an invitation to join a meeting; a combination thereof.

17. Logic encoded in a non-transitory medium which includes code for execution of a method in a video conference session having a video stream, an audio stream and an information stream between at least one first participant and at least one second participant, and, when executed by a processor, the code being operable to cause the processor to perform operations, comprising:

detecting, based on an analysis of at least one of the video stream, the audio stream or the information stream of the video conference session, an indication from a first participant of a wish to obtain additional information about at least one second participant;

selecting the at least one second participant according to a direction indicated by the first participant; and selectively providing additional information relating to the selected at least one second participant to a screen of at least one selected target device viewable by the first participant.

18. The logic of claim 17, wherein the direction is indicated by the first participant via at least one of:

navigating a remote controller associated with the first participant;

pointing to the selected at least one second participant with at least one of an object or at least one body part of the first participant; and selecting the selected at least one second participant at a portable personal device of the first participant.

19. An apparatus for use in a video conference session having a video stream, an audio stream and an information stream between at least one first participant and at least one second participant, the apparatus comprising:

a network interface device configured to enable communications over a network;

a processor configured to:

detect, based on an analysis of at least one of the video stream, the audio stream or the information stream of the video conference session, an indication from a first participant of a wish to obtain additional information about at least one second participant;

select the at least one second participant according to a direction indicated by the first participant; and selectively provide additional information relating to the selected at least one second participant to a screen of at least one selected target device viewable by the first participant.

20. The apparatus of claim 19, wherein the-direction is indicated by the first participant via one or more of:

navigating a remote controller associated with the first participant;

pointing to the selected second participant by at least one of an object or at least one body part of the first participant; and selecting the selected at least one second participant at a portable personal device of the first participant.

* * * * *